July 12, 1927.
J. SOKOLOV
1,635,229
SPARE WHEEL LOCK
Filed Jan. 19, 1927
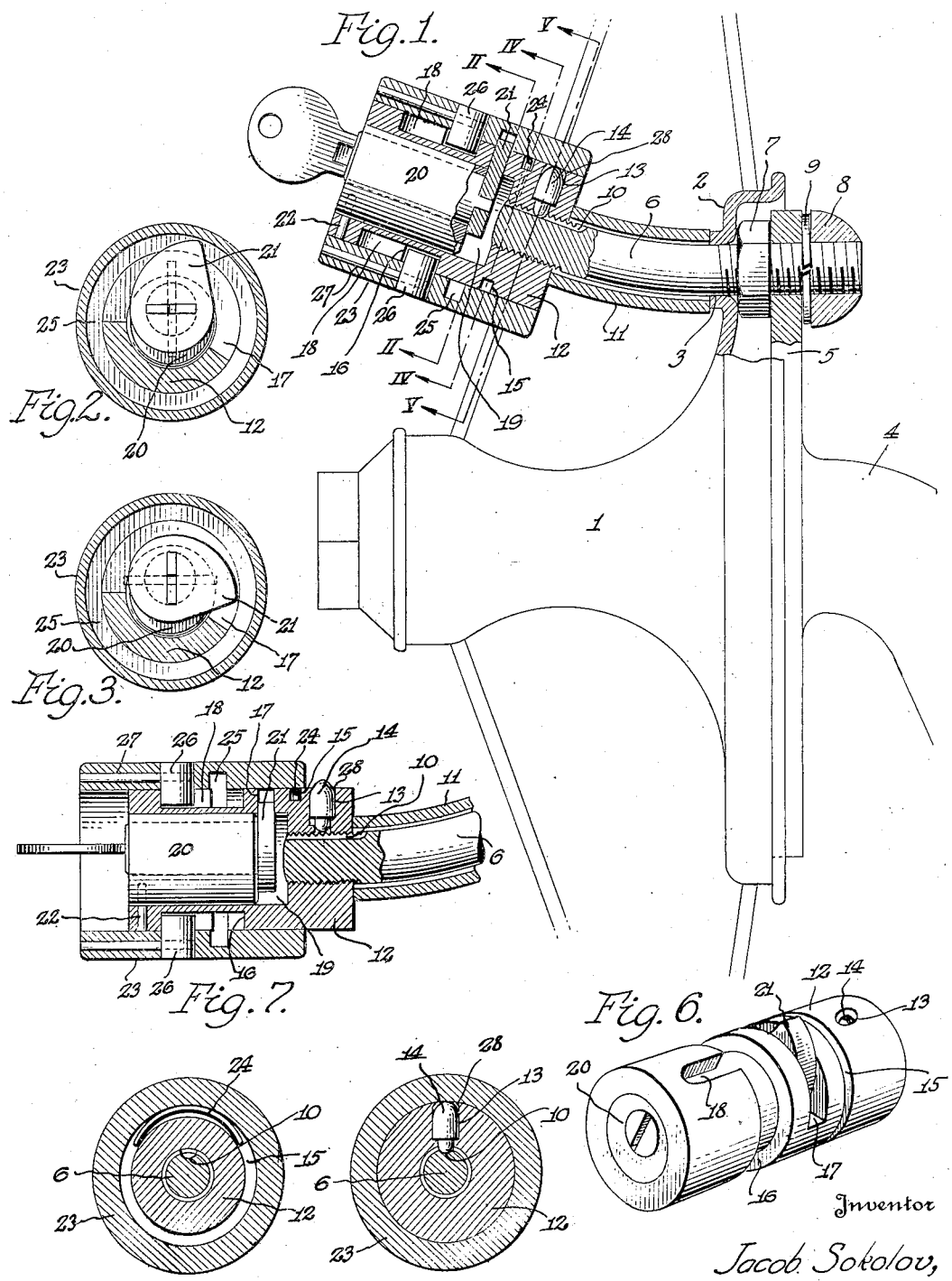
Inventor
Jacob Sokolov,
By
Attorneys Patented July 12, 1927.

1,635,229

UNITED STATES PATENT OFFICE.

JACOB SOKOLOV, OF DETROIT, MICHIGAN.

SPARE-WHEEL LOCK.

Application filed January 19, 1927. Serial No. 161,970.

My invention aims to provide a spare wheel locking device that may be advantageously used in connection with wheel carriers for preventing the theft or accidental displacement of a wheel mounted on the carrier, and in order that my locking device may be used it is only necessary to aperture a hub flange of the wheel to be mounted on a carrier and provide the carrier with a bolt, post or some other member on which my locking device may be readily mounted.

My invention further aims to provide a nut locking device wherein a nut or rotatable member is provided with a bolt engaging detent adapted to be held in engagement with the bolt by a reciprocable sleeve on the nut, and embodied in the nut is a lock adapted to prevent reciprocation of the sleeve. The nut and sleeve are articulated whereby the latter cannot become accidentally displaced, may in one position freely revolve relative to the nut, and in another position establish rotative continuity between the nut and sleeve so that said nut and sleeve may be removed as a unit from the carrier bolt or post.

My invention still further aims to provide a compact durable and comparatively inexpensive locking nut structure that will be hereinafter specifically described and then claimed. Reference will now be had to the drawing, wherein Figure 1 is a diagrammatic elevation of a portion of a spare wheel carrier provided with the locking device, which is shown in longitudinal section and in a locked condition;

Fig. 2 is a cross sectional view taken on the line II—II of Fig. 1;

Fig. 3 is a cross sectional view somewhat similar to Fig. 2, showing the lock mechanism in an unlocked position;

Fig. 4 is a cross sectional view taken on the line IV—IV of Fig. 1;

Fig. 5 is a similar view taken on the line V—V of Fig 1;

Fig. 6 is a perspective view of the nut or rotatable member, and

Fig. 7 is a longitudinal sectional view of the locking device in an unlocked condition.

As illustrating by the way of an example an article adapted to be held in a defined position, I show a portion of a spare wheel hub 1 having an annular flange 2 provided with an aperture 3. Such a spare wheel hub is adapted to be supported by a carrier 4 having a head 5 adapted to be confronted and somewhat inclosed by the flange 2 of the wheel hub 1. In order that the wheel hub 1 may be secured to the carrier it is necessary to establish a connection between the flange 2 and the head 5 and this may be conveniently accomplished by providing the head 5 with a bolt or stationary member that will extend through the aperture 3 of the hub flange 2 and permit of a nut or rotatable member being securely fixed thereon.

As an instance of a stationary member attached to the head 5 of the carrier 4, I show a bolt 6 having its inner end mounted in the head 5 and retained in engagement therewith by nuts 7 and 8 and a lock washer 9. The nut 7 is between the flange 2 and the head 5 and cannot be conveniently reached for removal, while the nut 8 is rounded or of such configuration that a tool cannot be conveniently placed in engagement therewith, thus preventing easy removal of the inner end of the bolt from the carrier head 5.

The outer end of the bolt 6 is also screw threaded and provided with a longitudinal groove 10. In order that my locking device may be easily mounted on this outer end of the bolt and positioned for convenient manipulation, the bolt 6 may be curved upwardly and provided with a spacing sleeve 11.

My locking device includes a cylindrical nut or rotatable member 12 adapted to be screwed on the outer end of the bolt 6 and the inner end of the rotatable member has a radially disposed stepped detent opening 13 for a stepped detent 14 having its inner and outer ends rounded with the small inner end of the detent adapted to extend into the groove 10 and prevent rotation of the member 12 relative to the bolt or stationary member 6. The detent 14 is reciprocable so that it may be shifted outwardly to permit of the rotatable member 12 being unscrewed and removed from the bolt or stationary member 6.

The nut or rotatable member 12 is best shown in Fig. 6, as having its periphery provided with grooves 15 and 16, a segmental slot 17, and opposed longitudinal grooves 18 communicating with the annular groove 16. Axially of the nut or rotatable member 12 is a bore 19 for a lock barrel 20 and this lock barrel forms part of a conventional form of key operated lock mechanism which includes an end crank 21 swingable within the slot 17 of the rotatable member 12. The lock barrel 20 may be suitably fixed in the outer end of the bore 19 by a pin 22 or other fastening means.

Rotatable and reciprocable on the periphery of the nut or rotatable member 12 is a sleeve 23 which may be frictionally held relative to the rotatable member 12, particularly against rattle, by a bowed spring 24 located within the groove 15 of the rotatable member 12. The inner wall of the sleeve 23 is provided with an annular groove 25 adapted to receive the crank 21 and prevent longitudinal movement of the sleeve on the rotatable member 12, yet permit of the sleeve rotating should an attempt be made to remove the nut or rotatable member 12 with the idea of surreptitiously removing the spare wheel from its carrier.

The sleeve 23 is provided with diametrically opposed inwardly projecting pins or studs 26 which may be suitably fixed in the sleeve, for instance by pins 27. The inner ends of the pins 26 are adapted to extend into the annular groove 16 of the rotatable member 12 and not interfere with rotation of the sleeve on the member 12, when the mechanism is in a locked condition, as shown in Fig. 1, but when the sleeve 23 is shifted outwardly the inner ends of the pins 26 enter the longitudinal grooves 18 and establish a driving relation between the sleeve 23 and the rotatable member 12, whereby these two elements as a unit may be removed from the bolt or stationary member 6.

As shown in Figs. 1 and 5 the inner end of the sleeve 23 closes the detent opening 13, prevents reciprocation of the detent 14, and with the inner end of the detent extending into the bolt groove 10, the rotatable member 12 will be held against rotation relative to the bolt or stationary member 6. The crank 21 extends into the annular groove 25 of the sleeve and thus prevents reciprocation of the sleeve on the rotatable member.

Assuming that the crank 21 has been retracted into the slot 17, the sleeve 23 may be rotated until the inner ends of the pins 26 are in position to enter the longitudinal grooves 18. Then the sleeve 23 may be pulled outwardly and thus uncover the outer end of the detent 14, but without uncovering the groove 15 of the rotatable member 12. This outward movement of the sleeve 23 has established a relation between the sleeve and rotatable member 12 whereby rotation of the sleeve carries the rotatable member 12 with it and initial rotation causes reciprocation of the detent 14, said detent being free to move outwardly from the groove 10 and thus permit of the rotatable member 12 being unscrewed from the bolt or stationary member 6.

By reference to Figs. 1, 5 and 7 it will be noted that the wall of the detent opening 13 is peened or inturned, as at 28, to prevent loss of the detent when uncovered by the sleeve 23.

My invention is not necessarily limited to a spare wheel carrier as the locking mechanism is applicable to any stationary member having an outer threaded and grooved end, and while in the drawing there is illustrated a preferred embodiment of my invention, it is to be understood that the structural elements are susceptible of such variations and modifications as fall within the scope of the appended claims.

What I claim is:

1. The combination of a stationary member having a threaded and grooved end, a rotatable member screwed on said stationary member, a detent in said rotatable member adapted to extend into the groove of said stationary member, a reciprocable sleeve on said rotatable member adapted to cover said detent, and means in said rotatable member adapted to extend into said sleeve and prevent reciprocation thereof.

2. The combination called for in claim 1, and a pin and groove connection between said sleeve and said rotatable member so that said sleeve may be used for imparting rotation to said rotatable member.

3. The combination of a stationary member, a rotatable member screwed thereon, a reciprocable detent carried by said rotatable member and adapted to engage in said stationary member, a reciprocable and rotatable sleeve on said rotatable member adapted to cover said detent and prevent reciprocation thereof, and means in said rotatable member adapted to extend into said sleeve and prevent reciprocation of said sleeve without interfering with rotation thereof.

4. The combination called for in claim 3, and a connection between said rotatable member and said sleeve conditioned by reciprocation of said sleeve for establishing a driving relation between said sleeve and rotatable member.

5. The combination called for in claim 3, and resilient means between said rotatable member and said sleeve and normally covered by said sleeve adapted to frictionally hold said sleeve relative to said rotatable member.

6. The combination of a stationary member, a rotatable member screwed on said stationary member, means on said stationary member to limit the screwing on movement of said rotatable member, a rotatable and reciprocable sleeve on said rotatable member, locking means in said rotatable member adapted to extend into said sleeve to prevent reciprocation thereof, and means between said rotatable member and said sleeve adapted to establish a driving relation therebetween so that said sleeve may be used for removing said rotatable member from said stationary member.

7. The combination called for in claim 6, and a reciprocable detent in said rotatable member engageable with said stationary member and normally concealed by said sleeve.

8. A lock comprising a rotatable member, a reciprocable sleeve thereon, retractible means holding said sleeve against reciprocation and permitting said sleeve to freely rotate relative to said rotatable member, and a connection between said sleeve and rotatable member conditioned by reciprocation of said sleeve relative to said rotatable member to hold said sleeve and member for rotation in synchronism so that said rotatable member may be attached to a support.

9. A lock as called for in claim 8, and a detent in said rotatable member adapted to be covered by said reciprocable sleeve to hold said detent in engagement with the support about which said rotatable member may be attached.

In testimony whereof I affix my signature.

JACOB SOKOLOV.